Patented Sept. 21, 1943

2,330,062

UNITED STATES PATENT OFFICE 2,330,062

SILVER-COPPER SOLDER ALLOY

Joseph Lempert, Bloomfield, N. J., assignor to Westinghouse Electric & Manufacturing Company, East Pittsburgh, Pa., a corporation of Pennsylvania No Drawing. Application September 24, 1941, Serial No. 412,110

5 Claims. (Cl. 75—153)

This invention relates to alloys and is concerned more particularly with a novel alloy for soldering and brazing purposes.

In the electronic art, as well as in other arts, it is necessary at times to obtain a seal between two dissimilar metals with the seal having a characteristic of such perfection that it will absorb differences in expansion and prevent leakage of high pressure or vacuum. The problem of making such seals is not confined to the initial formation thereof but extends into the realm of uncertainties of further fabricating processes and of possible or even probable rough usage during the life of the article or device wherein the soldering is employed. For instance, it is now an accepted practice to employ an alloy known as "Kovar" consisting essentially of iron, nickel and cobalt, as an intermediate part between glass and a steel or copper part, the "Kovar" being employed because of its characteristic of having the same coefficient of expansion as the glass, thereby effecting a perfect seal with respect to the glass. This has introduced the necessity of sealing the "Kovar" part with respect to the steel or copper part. Since both of these parts are metal, the seal is less likely to be ruptured in consequence of different coefficients of expansion, but since there is a very decided difference in the coefficients of expansion of the two metal parts, a considerable strain is placed upon the solder or braze utilized in connecting them together.

The prior art contains many proposed soldering alloys, and in connection therewith, it is well known to those skilled in the art that variation of ingredients or proportion of ingredients results in different characteristics of the resultant material. It has been considered desirable, or perhaps even necessary, to provide for a comparatively low melting point and to obtain the formation of eutectics, and accordingly, the prior art has been directed to obtaining good flowing and wetting characteristics by addition of substantial amounts of a flux or of an alloy ingredient, such as cadmium, magnesium, lithium, beryllium, and other substances to the main constituents of the soldering alloy.

It appears from careful photomicrographing that the usual silver solder alloy is irregular in its constituency, the alloy proper containing blotches of the eutectic material; and further it can be stated that the eutectic is the constituent of the alloy having the lowest melting temperature. By virtue of the apparent tendency of the eutectic to migrate toward the joint or surface being soldered it has been found that it is the eutectic portion which enters the grain boundaries of the metal and thereby constitutes the portion of the solder which obtains the gripping action on the said metal being soldered. During the soldering operation, the longer the mass is held in its molten state, the greater the concentration of the eutectic becomes next the surface being soldered and the greater the penetration into the grain boundaries becomes.

If the "Kovar," or other material being soldered, is in a strained condition, even momentarily, when cooling is taking place and the eutectic within the grain boundaries has already hardened, the eutectic acts as a wedge, having a different contraction rate than the "Kovar" and resultant therefrom the "Kovar" rips along its grain boundaries causing leaks. While the solder is in fluid state during application, and subsequently raising of the same to even moderately high temperatures, deeper penetration of the eutectic results, instances having been observed of the eutectic forcing its way entirely through the metal to which the solder is applied so as to appear upon and extrude from the opposite face of such metal. Obviously, so deep a penetration interposes more and more eutectic within the granular structure of the metal and thereby increases the strain imposed upon the said metal when it contracts after the eutectic has solidified.

It may also be stated that usual silver solders start to melt at or about 779° C. which is the melting point of the eutectic. This temperature is relatively so low that during the fabrication of an electronic device, and even in the use of such device, the temperature is apt to reach and exceed this melting temperature resulting in the destruction of the electronic device since atmospheric leakage will then occur. Higher melting point for the solder makes the exhaust operation during fabrication less critical with beneficial result of lower percentage of losses.

Tests have shown that penetration of the eutectic one-sixth of the thickness of the "Kovar" to which it is applied, has resulted in a rupture occurring, apparently, as explained above, by the wedge action of the solidified eutectic in the grain boundaries during the continued contraction of the "Kovar." The tests show that the eutectic making a penetration of .005" in the grain boundaries of "Kovar" having a total thickness of .028" resulted in rupture. These figures accordingly substantiate the statement that rupture may possibly occur upon penetration of one-sixth or more into the thickness of the "Kovar." The fact that penetration does not cease when the soldering operation is completed, but recurs each time the temperature is raised to approach the melting point of the eutectic, makes the use of silver solder of the characterization heretofore outlined dangerous from the standpoint of probable failure of the joint to maintain a vacuum-tight seal.

An object of the present invention is accordingly to improve upon silver solder to overcome the shortcomings of solder of the prior art.

Another object of the present invention is to provide a silver solder which will have less penetration into the grain boundaries of the material being soldered than solders of the prior art.

A still further object of the present invention is to avoid progressive penetration during fabrication or use of the device soldered.

Yet another object of the present invention is to utilize a combination of elements to form the solder in such proportion as to substantially avoid the formation of eutectic within the range of temperatures to which the solder is subjected.

Again, an object of the present invention is to provide a silver solder having a higher melting point than those heretofore employed.

A further object of the invention is to improve the vapor pressure characteristics of the silver solder.

Another object of the present invention is to provide a silver solder which will have a penetration of less than one-sixth of the thickness of material being soldered.

Still other objects of the present invention will appear to those skilled in the art to which the invention appertains as the description progresses, both by direct statement thereof and by implication from the context.

After careful study of and experimentation with silver solder, I have found that the formation of detrimental eutectic in the solder occurs when the amount of silver included with copper assumes any high proportion. It may be stated at this time, by way of information, that the silver-copper eutectic is at the proportion of 71.9 per cent silver with 28.1 per cent copper, and that the usual silver solders heretofore employed utilizing from 71.9 to 50 per cent silver and 28.1 to 50 per cent copper having melting points approximately between 779° C. and 850° C.; the melting point of silver-copper eutectic being approximately 779° C. This necessitates that all the fabricating processes and usage of the device must not exceed the melting temperature of the solder, and accordingly renders the temperature critical for the device and requires more careful attention both during fabrication and usage to avoid exceeding the dangerous temperature. It may furthermore be stated that pure copper is ideal for sealing purposes, and is often used, its melting temperature being 1083° C. Obviously, however, the use of copper as a solder cannot be conveniently employed on copper or other metal having the same or lower melting temperature. I have discovered that a composition of less than eight per cent silver, alloyed with remaining percentage of copper, has a melting temperature less than that of copper alone, namely, between 779° C. to 1020° C. and this temperature range becomes higher as the proportion of silver decreases. A most desirable combination is that of 6 per cent silver to approximately 94 per cent copper which has a melting temperature range between 930° C. and 1025° C. Solders of this invention having proportions of constituents as just mentioned have melting temperatures considerably higher than the melting points of previous solders above mentioned. Accordingly, while my invention broadly contemplates use of copper and silver within this range of 0 to 8 per cent silver, I preferably employ 6 per cent silver and remainder of 94 per cent copper.

I have also discovered that this alloy of two ingredients, namely, copper with a percentage from zero to eight per cent silver, is below the range of formation of eutectic and that substantially no eutectic is formed in consequence of which the soldering effect is accomplished by the inter-granular penetration of the alloy mixture in the "Kovar" or other metal being soldered. The absence of eutectic gives the beneficial result of substantially no further penetration after application of the solder in place. It will accordingly be seen that both the increase of melting point and the absence of eutectic co-operate to obtain a permanent soldered joint without danger of cracking due to penetration and provides a solder which will make fabrication of an article wherein the solder is used less critical as to employment of high temperatures. In this connection, it can also be said that where the solder of this invention is utilized with an evacuated electronic device, further important beneficial results are obtained. Since, as between the silver and copper, the silver is the higher vapor pressure material, reduction of the quantity of silver in the alloy will reduce the probability of obtaining a deposit on the electrodes, or elsewhere, on exhaust. Reduction in the amount of silver also introduces an advantageous economy.

A further beneficial result of the invention resides in the fact that brazing can be performed in a brazing furnace and the assembly can therefore be treated at 850° C. to 900° C. in a hydrogen furnace to decarbonize the "Kovar." This hydrogen furnace treatment cannot be performed with a silver solder which is in the eutectic range.

The invention herein explained is therefore to be understood as contemplating a silver solder utilizing a combination of copper and silver outside of the eutectic range of those materials, and as obtaining a solder wherein the silver is in such small proportion, namely, within the range of above 0 and up to 8 per cent, so as to substantially avoid formation of eutectic in the solder. The invention further contemplates utilization of copper as the predominating constituent, combined with a small amount of another material, specifically silver, by which the melting point of the solder is included within the range of the eutectic melting point of silver-copper solder of 779° C. to the melting point of copper, namely, 1083° C.

Since the various details of ingredients, as well as the precise relation and functioning thereof with respect to each other and with respect to the materials being soldered, also as to what materials are being soldered, are subject to variation and change without departing from the inventive concept or scope of the invention, it is intended that all matter contained in the specification shall be interpreted as exemplary and not in a limiting sense. It is also to be understood that the following claims are intended to cover all of the generic and specific features of the invention herein described and within the proportions up to the maximum percentages recited and all statements of the scope of the invention herein set forth, as a matter of language which might be said to fall therebetween.

I claim:

1. A silver solder consisting of a composition of a preponderance of copper alloyed with silver and with the silver in such small proportion as to substantially avoid formation of eutectic.

2. A silver solder comprising a composition predominating in copper and having its melting point lowered from that of copper to a range between 779° C. to 1083° C. by silver added to the copper in such small proportion as to substantially avoid formation of eutectic within the said temperature range.

3. A silver solder comprising a composition predominating in copper and having its melting point lowered from that of copper to a range between 779° C. to 1083° C. by silver added to the copper in such small proportion as to substantially avoid formation of eutectic within the said temperature range.

4. A silver solder comprising a composition of a preponderance of copper in the range between 92 and substantially 100 per cent of the composition and having its melting point lowered from that of copper to a range between 779° C. to 1083° C. by addition thereto of silver in amounts up to 8 per cent of the composition and in such small proportion as to substantially avoid formation of eutectic within the said temperature range.

5. A soldering alloy having constituents in proportion outside the eutectic range thereof and comprising copper in an amount of substantially 94% and silver in an amount of substantially 6%.

JOSEPH LEMPERT.